United States Patent [19]

Bayless

[11] Patent Number: 5,326,970
[45] Date of Patent: Jul. 5, 1994

[54] METHOD AND APPARATUS FOR LOGGING MEDIA OF A BOREHOLE

[76] Inventor: John R. Bayless, 20325 Seaboard Rd., Malibu, Calif. 90265

[21] Appl. No.: 792,467

[22] Filed: Nov. 12, 1991

[51] Int. Cl.$^5$ .............................................. G01V 5/08
[52] U.S. Cl. ................................... 250/269; 250/262; 378/89; 328/233
[58] Field of Search .................. 250/269, 262; 378/86, 378/88, 89; 328/233

[56] References Cited

U.S. PATENT DOCUMENTS

| | | | |
|---|---|---|---|
| 3,218,562 | 11/1965 | Serduke | 328/233 |
| 3,976,879 | 8/1976 | Turcotte | 250/269 |
| 4,093,854 | 6/1978 | Turcotte et al. | 250/269 |
| 4,928,020 | 5/1990 | Brix et al. | 328/233 |
| 5,122,662 | 6/1992 | Chen et al. | 250/269 |

OTHER PUBLICATIONS

Belkin, et al, "Measuring The Density of Rocks in Boreholes by Means of a Gamma Generator", Sep. 21, 1975 pp. 569–572.

Primary Examiner—Carolyn E. Fields
Assistant Examiner—Drew A. Dunn
Attorney, Agent, or Firm—Jack C. Munro

[57] ABSTRACT

The method and apparatus for logging the media of an earth formation wherein repetitive bursts of x-rays are emitted that penetrate the media with a portion of these x-rays to be scattered and picked up by a plurality of detectors to detect certain physical properties of the media such as density and lithology. The x-rays are produced by an electron beam striking an x-ray target. This electron beam is produced electrically within an electron beam generator and then accelerated through a linear induction accelerator. The linear induction accelerator, in contrast to other alternatives, is of simple design and inherently insensitive to mechanical shock and vibration and to variations in operating temperature.

24 Claims, 3 Drawing Sheets

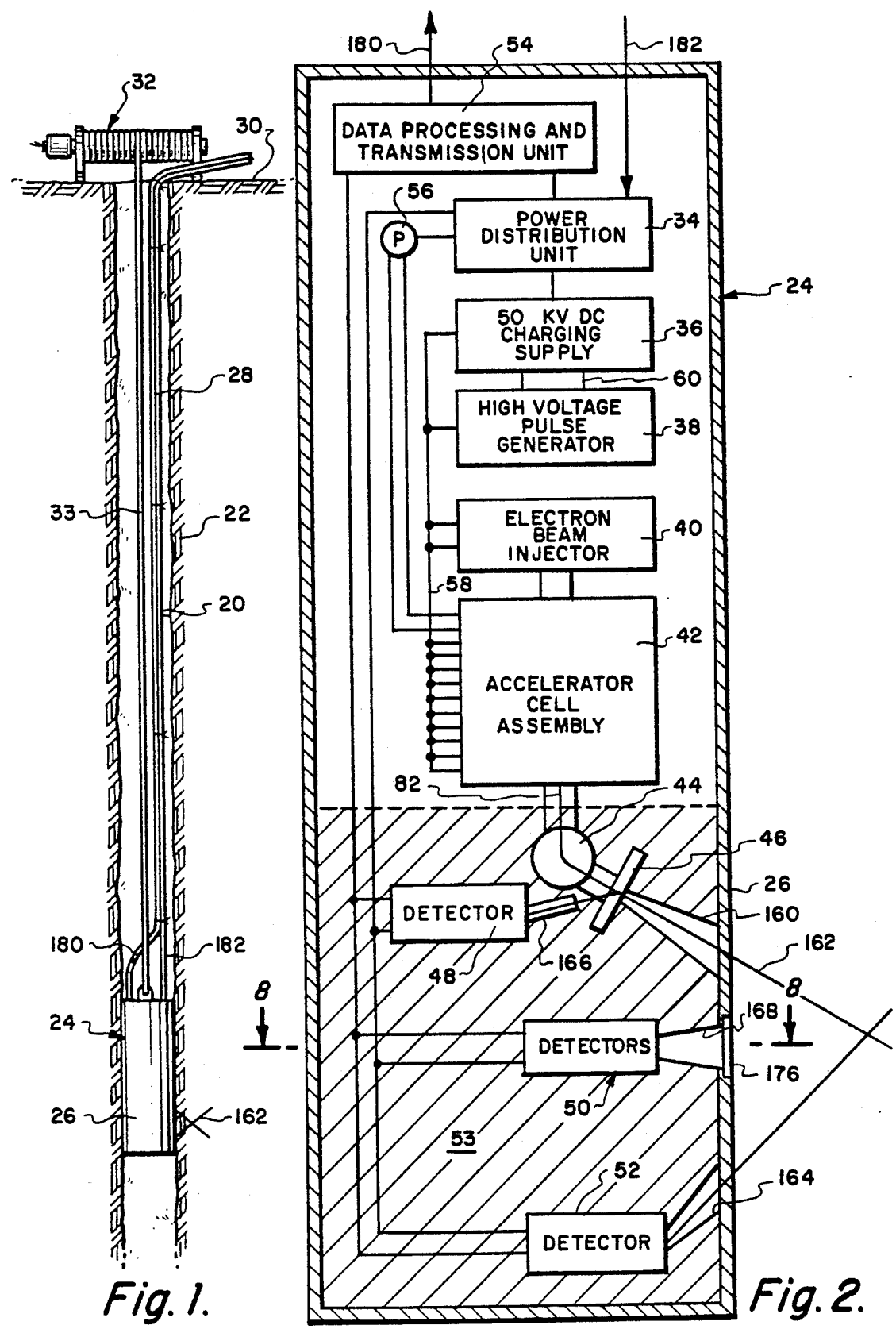

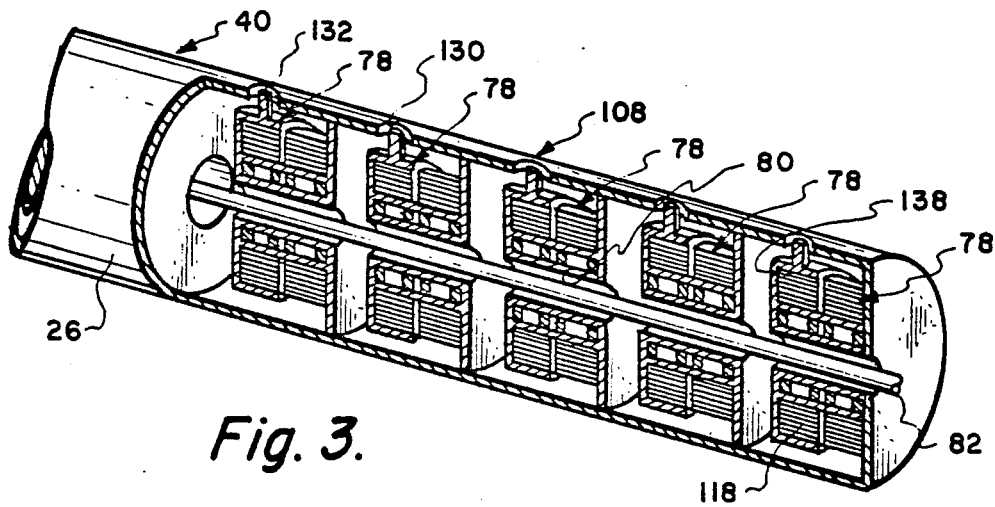
Fig. 3.
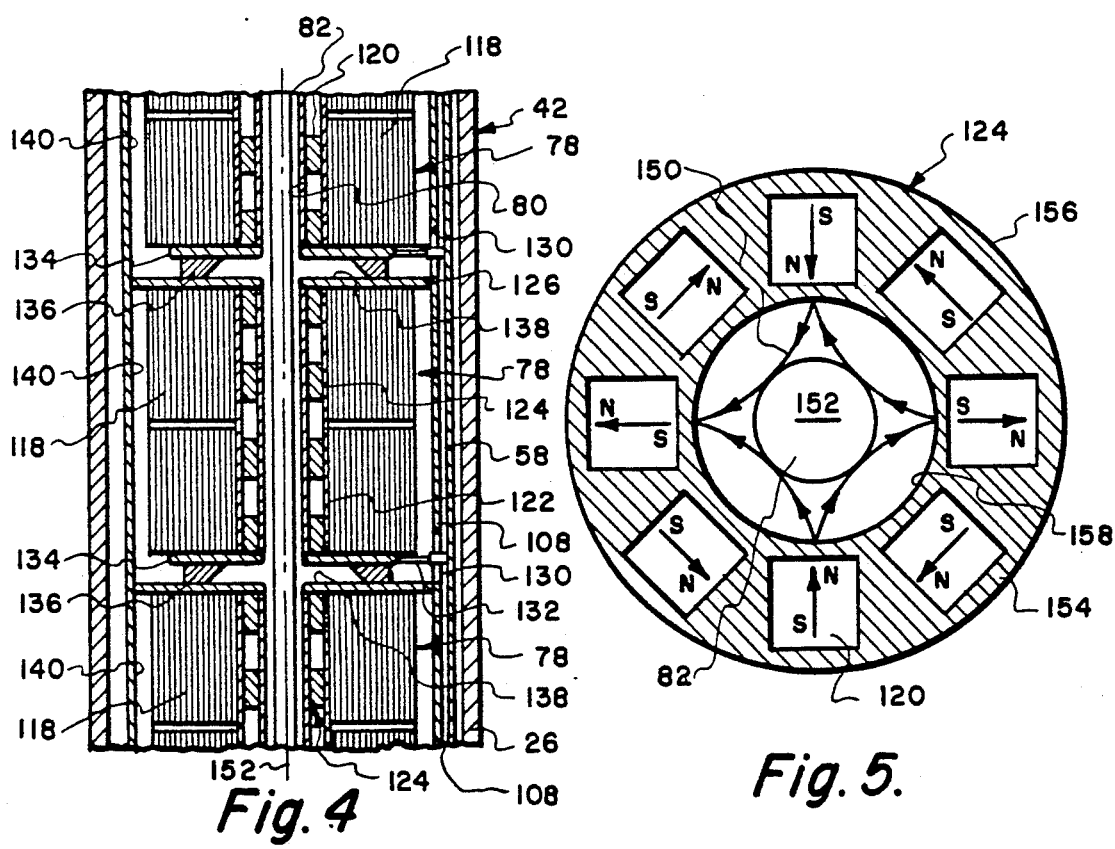
Fig. 4.
Fig. 5.

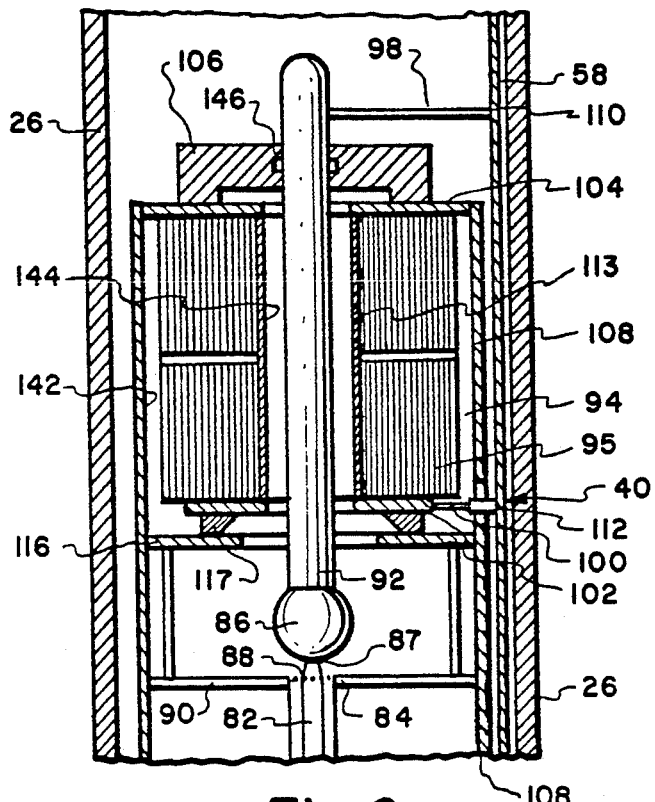
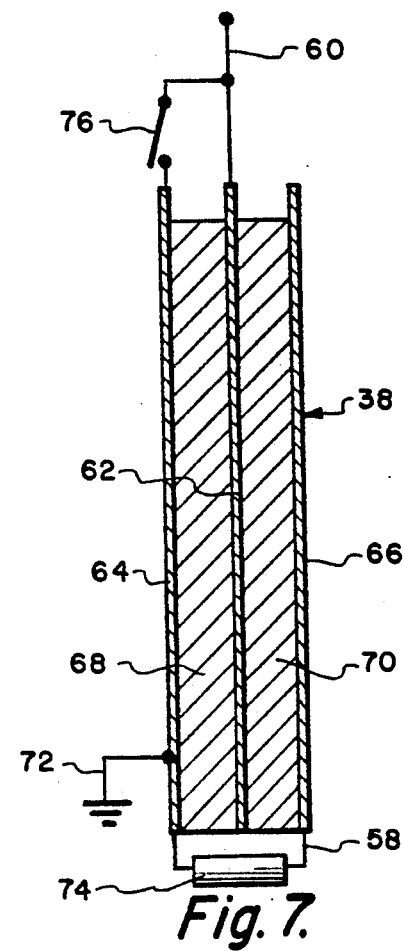
Fig. 6.  Fig. 7.
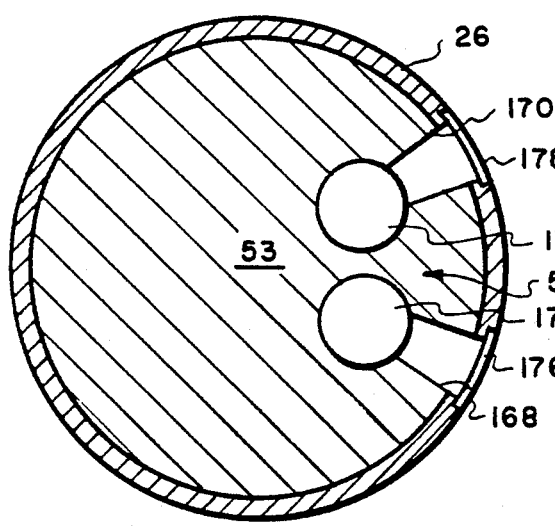
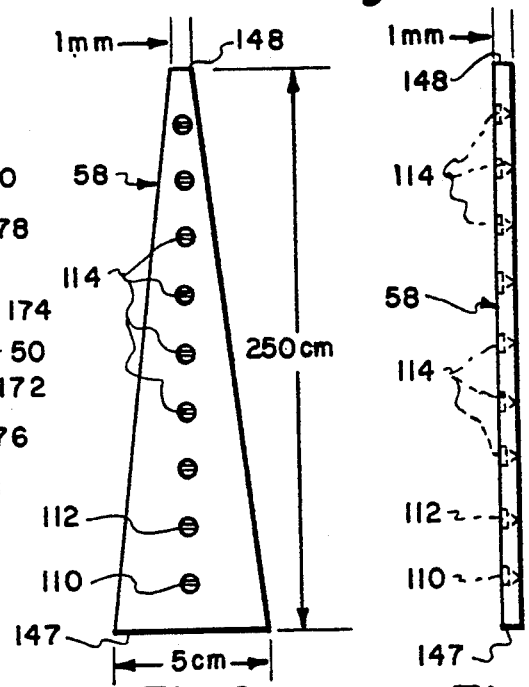
Fig. 8.  Fig. 9.  Fig. 10.

METHOD AND APPARATUS FOR LOGGING MEDIA OF A BOREHOLE

BACKGROUND OF THE INVENTION

1. FIELD OF THE INVENTION

The field of this invention relates to logging instruments for ascertaining physical properties of media such as the earth surrounding an oil well borehole, and more particularly to a logging instrument which utilizes non-nuclear radiation to determine the physical properties of the media.

2. DESCRIPTION OF THE PRIOR ART

The measurement of material bulk density, lithology and other material properties as a function of depth in boreholes within the earth is of major importance for analyzing oil and gas reservoirs, aquifers and mineral deposits. Radioactive photon sources, which release gamma-rays, are currently used extensively in the measurement of formation properties such as bulk density and lithology in boreholes. These properties are determined by measuring the intensity of the gamma-rays that are scattered from the formation surrounding the borehole. Radioactive logging tools typically use one to two curies of 137Cs or 60Co as the source of gamma-rays. Stronger sources, containing more radioactive material, are usually precluded due to the safety hazards associated with handling and transporting of such radioactive tools.

It is common for boreholes to be between ten thousand and thirty thousand feet in depth. Sometimes during the operation of these tools, the tool becomes lodged in the borehole and the tool can not be easily removed. Even though these tools are reasonably expensive, it may be economical to merely close the borehole and lose the tool. However, environmentalists express substantial dissatisfaction with the locating of a radioactive source deep within the earth. It is a concern that this radioactive source, because of its inherently long radiation emission lifespan, will contaminate underground water. Therefore, there has been substantial interest in developing a non-nuclear type of logging tool that, in case the tool becomes lost deep within the earth, can be merely abandoned with such abandonment being safe (not creating any kind of a hazard).

In addition, it would be desireable to have tools with higher source intensity in order to facilitate higher logging speeds. Higher intensities are not practical with radioactive tools due to the increased hazards.

Previously, work has been performed to develop a small, high energy electron beam source to create an intense x-ray stream which could be used in logging tools (Turcotte, U.S. Pat. No. 3,976,879; Turcotte, U.S. Pat. No. 4,093,854). This work utilizes scattering of x-rays in the media of the borehole in a manner similar to the way that the gamma-rays have been used to determine the various properties of the media. These prior art approaches utilized a high energy electron beam which is directed onto an x-ray target where the x-rays are produced.

Creation of the x-rays is accomplished using the high energy electron beam. There are several types of electron accelerators which can be considered for use in such a tool. The simplest is the diode accelerator in which electrons are accelerated to high energies in a single gap between an electrode which is biased at a negative high voltage relative to a grounded electrode. Electrons are drawn from the negative electrode and accelerated across the inter-electrode gap and, by providing a hole in the grounded electrode, electrons can be extracted to form a beam. One of the disadvantages of diode accelerators is that such require a voltage comparable to the beam voltage, which therefore, requires a high voltage source. The usage of high voltage and a high voltage source encourages electrical breakdown in the tool. Typically the diode accelerator requires approximately one megavolt where the tool of the present invention requires only fifty kilovolts. Additionally, a diode accelerator is difficult to produce with a compact structure. Since one of the primary usages of the present invention is within the limited space of an oil well borehole, it is difficult to construct a diode accelerator to be used within such a limited space environment.

Recirculating accelerators, including betatrons and synchrotrons, can be considered for use to generate x-rays within a logging tool. Betatrons and synchrotrons accelerate electrons as such pass repeatedly around a closed accelerating path. Again, size limitation is the main drawback to such accelerators.

Linear accelerators appear to be the most feasible in conjunction with non-nuclear logging tools. Linear accelerators are limited to radio frequency and induction types. Substantial work has been completed in the past with radio frequency accelerators for application to logging operations. Reference is to be had to the aforementioned Turcotte patent (U.S. Pat. No. 4,093,854).

Radio frequency accelerators contain electrically resonant structures which must be tuned accurately to the frequency of the radio frequency generator which is used to energize the accelerator. The radio frequency generator can be operated either continuously or in a pulsed mode. Because of the sensitivity of radio frequency linear accelerators to tuning, sophisticated mechanisms must be provided to compensate for changes in tuning as the dimensions of the accelerating structure changes due to changes in temperature. Logging tools must be capable of operating over a temperature range of between 0° Centigrade and 175° Centigrade. Another patent which shows a similar type of radio frequency accelerator in conjunction with the logging tool is Haimson, No. 4,713,581.

One of the primary disadvantages to radio frequency linear accelerators in logging tools is their expense. Inherently such are quite complex and, therefore, quite expensive. The estimate at the present time is for such tools to cost as much as $250,000.

SUMMARY OF THE INVENTION

A method of logging and logging apparatus utilizing a linear induction accelerator in conjunction with a logging tool. The apparatus of this invention when used in conjunction with boreholes is located within a cylindrical housing no more than twenty centimeters in diameter. Electrical energy is supplied to a pulse generator which creates a repetitive series of electrical pulses at a preselected voltage, current and time. These pulses are applied to an electron beam generator to produce an electron beam. The pulses of the electron beam are supplied to a plurality of acceleration cells of a linear induction accelerator. Each cell is powered by an electrical pulse having the same voltage, same current and the same duration. Not only do these cells accelerate the electron beam but these cells confine and focus the electron beam along a given path. The electron beam is then turned by a bending magnet and bombarded against an x-ray emitting target. The electron bombarding of the target produces a stream of x-rays which is then emitted into the earth media. The greater the density, along with other properties, of the media, the greater the amount of scattering and absorption of the x-rays. Detectors are mounted at appropriate locations to detect x-rays of various energies that are scattered back to the apparatus. The intercepted x-ray radiation is measured and compared with the amount of emitted radiation and this information is supplied to a data processing and transmission unit. An output signal from the data processing and transmission unit is transmitted to an appropriate receiver at the earth's surface which collects the information that is obtained.

One object of the present invention is to provide a method and apparatus for generating x-ray pulses in conjunction with a borehole logging tool using a compact system which is readily conductable down the entire length of the borehole and which is inherently insensitive to changes in temperature which occur as the tool traverses the entire length of the borehole.

Another objective of the present invention is that by applying a pulsed voltage to a plurality of acceleration cells, an electron beam that is accelerated between the cells obtains a final voltage that is the sum of the individual cell voltages thus obtaining a high beam voltage without requiring comparable input voltage and thereby decreasing the possibility of breakdown which is common within apparatuses that require very high input voltages.

Another objective of the present invention is to utilize greater intensity than what is used in conjunction with radioactive tools thereby making the tool of the present invention have a higher sensitivity, permitting greater logging speed while offering greater safety during handling and transport.

Another objective of the present invention is to construct a tool that is more rugged, capable of higher operating temperatures and less expensive than other similar types of logging tools.

Another objective of the present invention compared to the radio frequency logging tool is that tools built according to the present invention will be substantially less expensive, capable of operating reliably at higher temperatures (since the accelerator of the present invention does not employ temperature-sensitive structures), more rugged and therefore capable of incurring rough handling (which is common around oil wells) without damage, and superior in logging capabilities.

Another objective of the present invention is to construct a tool that will have numerous applications including oil and gas exploration, mining, groundwater and environmental studies.

BRIEF DESCRIPTION OF THE DRAWINGS

FIG. 1 is a representational view, in longitudinal cross-section, showing usage of the logging tool of the present invention within a borehole;

FIG. 2 is a depiction in block diagram form of the apparatus of the present invention;

FIG. 3 is a cross-sectional view showing the electron injector in conjunction with the acceleration cells utilized in conjunction with the apparatus of the present invention;

FIG. 4 is a more detailed, segmental, cross-sectional view of the acceleration cells used in conjunction with the apparatus of the present invention;

FIG. 5 depicts in cross section a typical configuration for a permanent magnet quadrupole lens which is used to confine and focus the electron beam within the accelerator of the apparatus of the present invention;

FIG. 6 is a cross-sectional view of the electron injector utilized in conjunction with the apparatus of the present invention;

FIG. 7 is a cross-sectional configuration of a type of pulse generator that could be used to drive the linear induction accelerator incorporated within the apparatus of the present invention;

FIG. 8 is a cross-sectional view of a portion of the apparatus of the present invention taken along line 8—8 of FIG. 2 showing in more detail the arrangement between the pair of low energy detectors adapted to receive low energy scattered x-rays.

FIG. 9 is a top plan view of a form of matched transmission line which could be utilized in conjunction with the apparatus of the present invention; and FIG. 10 is a side view of the high voltage transmission line of FIG. 9.

DETAILED DESCRIPTION OF THE SHOWN EMBODIMENT

Referring particularly to FIG. 1, there is depicted a borehole 20 of an oil well. Borehole 20 is formed within media 22 of the earth. It is to be understood that it would not be unusual to have the depths be between 1,000 and more than 20,000 feet for the borehole 20. The logging tool 24 of this invention is shown being located within borehole 20. Logging tool 24 is depicted located against the wall of borehole 20. The logging tool 24 includes a casing or housing 26 which is cylindrical and would normally be constructed of metal. When the logging tool 24 of this invention is intended to be used within the borehole 20, generally the maximum size in diameter for the logging tool 24 will be no greater than twenty centimeters. Maximum length is envisioned to be no more than ten meters Maximum weight is approximately 250 kilograms. The borehole 20 may be uncased and the density range of the media 22 is to be between approximately one and three grams per cubic centimeter. The maximum operated temperature is to be approximately 175° C. Power is to be supplied to the logging tool 24 through cables 28. Cables 28 are to be connected to a source of power (not shown) located on the surface 30 of the earth. Some type of winch mechanism 32 is to be connected to the apparatus 24 of this invention by means of cable 33. The logging tool 24 is to be raised at a speed of approximately one hundred feet per minute during the time that the logging tool 24 is to be operated.

Referring particularly to FIG. 2, within the housing 26 is mounted the various components of the logging tool 24. These various components constitute a power distribution unit 34, a fifty kilovolt DC charging supply 36, a high voltage pulse generator 38, an electron beam injector 40, accelerator cell assembly 42, a bending magnet assembly 44, an x-ray target 46, detector 48, detector 50, detector 52 and data processing and transmission unit 54. From the source (not shown), voltage and current from cables 29 is to be supplied to the power distribution unit 34. It is the function of the power distribution unit 34 to accept the power from the surface 30 of the earth and deliver power at approximately one hundred volts AC to the charging supply 36, to a vacuum pump 56, to detectors 48, 50 and 52, and to data processing and telemetry unit 54. Charging supply 36 also includes a low voltage pulse generator (not shown) to deliver one hundred volt pulses of approximately ten microseconds duration to reset the magnetic state of the linear induction cores 78 in accelerator cell assembly 42 after each negative fifty kilovolt, twenty nanosecond drive pulse has been applied. The resetting pulse is connected to the transmission line 58 through a high voltage, high inductive choke (not shown). This choke holds off the negative fifty kilovolt, twenty nanosecond drive pulse while allowing the slower ten microsecond reset pulses to pass. Alternately, the induction cores 78 can be designed so that such spontaneously return to the magnetic state existing before the drive pulse was applied.

Basic design of the housing 26 is that of cylindrical tube with a wall thickness of up to approximately one centimeter in order to withstand external pressures of up to approximately 20,000 pounds per square inch. Electrical connections to the logging tool 24 of this invention is provided through the use of a cable head connector (not shown). Electrical connection can also be provided at the opposite end of the tool in order to facilitate the connection of other tools in series with the subject tool.

The high voltage pulse generator 38 is used to drive the linear induction accelerator cell assembly 42 and electron beam injector 40. The pulse generator 38 utilizes a three-plate pulse forming line in a Blumlein configuration as is illustrated schematically in FIG. 7. The charging voltage from the charging supply 36 is supplied through conductor 60 to conducting plate 62. On one side of the conducting plate 62 is conducting plate 64, and on the opposite side of plate 62 is conducting plate 66. In between plates 62 and 64 is a Kapton or Mylar (tradenames) insulating sheet 68. A similar such sheet 70 is located between plates 62 and 66. Plate 64 is grounded by ground line 72. The transmission line 58 is depicted generally connecting plates 64 and 66 of the high voltage pulse generator 38 with load 74 consisting generally of the combination of the electron beam injector 40 and the accelerator cell assembly 42. Other pulse forming line designs can also be used for generating substantially square drive pulses.

The high voltage pulse generator 38 delivers a substantially square output pulse into load 74 at a voltage of negative fifty kilovolts. The plates 62, 64 and 66 are constructed of copper. The high temperature dielectric material insulating sheets 68 and 70 have a dielectric constant of approximately three. The thickness of each of the insulating sheets 68 and 70 is approximately 0.2 centimeters which is the minimum required to avoid electrical breakdown of the insulating sheets 68 and 70 at the maximum operating temperature of a 175° C. The width (not shown) of plates 62, 64 and 70 will normally be about five centimeters and this width is chosen so that the impedance of the pulse forming line of the pulse generator 38 is approximately equal to that of the load 74 which it drives. The length of this pulse forming line is chosen to be approximately 170 centimeters to provide an output pulse length of twenty nanoseconds (the pulse length equals twice the time required for an electromagnetic wave to travel along the length of the pulse forming line). The pulse generator 38 is discharged in the load 74 by triggering of the gas filled, spark gap switch 76 shown in FIG. 7. Other types of switches can also be used.

The linear induction accelerator is defined generally as the combination of the injector 40 and the accelerator cell assembly 42. Injector 40 is defined generally as an approximately one hundred kilovolt electron injector. The acceleration cell assembly 42 consists of eighteen induction cells such as shown in FIG. 3 but it can consist of a greater or lesser number. Referring particularly to FIG. 3, five in number of the induction cells 78 are shown. The output energy of the linear induction accelerator could be in the range of two hundred kilovolts to four megavolts. The acceleration voltage of each induction cell 78 could be in the range of approximately ten kilovolts to one hundred kilovolts with the number of the cells 78 being chosen so that the required output electron beam energy is achieved.

The pulse generator 38 delivers twenty nanosecond pulses to the transmission line 58 at a voltage of fifty kilovolts. The pulse length could be in the range of approximately one nanosecond to fifty nanoseconds and the output voltage could be in the range of approximately ten kilovolts to one hundred kilovolts.

The accelerator cell assembly 42 includes a path 80. It is down the path 80 that the beam 82 is directed as shown in FIGS. 3 and 4. It is necessary to draw a vacuum within the entire length of the path 80. This is accomplished by means of the vacuum pump 56. Normally there will be a space of approximately seven cm in diameter and two cm long provided between the third and fourth induction cells 78 (nearest the injector 40) where the vacuum pump 56 would be located. A desirable type of pump would be a titanium sublimator pump where a titanium-loaded filament is heated electrically in order to evaporate titanium onto the walls of the pump volume and thus provide a continuously replenished gettering surface. The path 80 is initially evacuated using a laboratory vacuum pump until the pressure is sufficiently low that the pump 56 can maintain the vacuum so that the pressure is less than one millitorr. The laboratory pumping system is then valved off and removed. Alternately, one can use an ion sputter-type vacuum pump and/or locate the pump 56 in any desired location.

The primary components of the linear induction accelerator are the accelerator cell assembly 42 and the injector 40. FIG. 6 shows the injector 40 in more detail. The main objective in designing the injector 40 is to provide a sufficiently high voltage in a small diameter assembly that the desired electron beam current can be extracted from the cathode emitter 87 which forms part of cathode 86 through the anode screen 88 into the well-formed beam 82. A screen-covered hole 84 in the anode 90 allows the electrons to pass through it and into the accelerator cell assembly 42. The anode screen 88 is constructed of eighty percent transparent tungsten mesh. A pulsed voltage of negative one hundred kilovolts is applied between the cathode 86 and the anode 90 in order to extract approximately ten amperes through the screen 88. This voltage is applied by adding two fifty kilovolt pulses on the cathode stalk 92. One pulse is applied directly to cathode stalk 92 and the second is applied to induction cell 94. Other injector designs can be used in which more or fewer induction cells are used.

A field emission cathode emitter 87 is used as a source of electrons because it is the simplest to implement (no additional power is required) and because it is expected to offer adequate lifespan for the short pulse lengths and low current densities required for the logging tool 24 of this invention. The type of cathode emitter 87 is formed of sharp points (not shown) which serve to enhance the applied electric field. Typical devices (not shown) which could be utilized to produce the desired sharp points are a single tungsten pin, a bundle of ten to one hundred micron-diameter tungsten wires, carbon felt, carbon fibers or dielectric fibers. Although electrons are initially released from the cathode emitter 87 by field emission, localized heating of the emission sites leads to plasma formation. Thus, emission for most of the pulse is from the plasma. Although the plasma expands at a few centimeters per microsecond from the surface of the cathode emitter 87, thereby reducing the anode-cathode gap in time, this is not an important effect for a pulse length of twenty nanoseconds. Alternately, other types of cathodes could be used including thermionic cathodes, pulsed plasma cathodes and secondary emission cathodes.

The construction of the induction cell 94 is essentially similar to what will be described later in conjunction with the induction cells 78 and reference is to be had to that description. Electrical pulses from high voltage pulse generator 38 are transmitted to the electron beam injector 40 by transmission line 58. Electrical lead 98 connects the transmission line 58 to the cathode stalk 92. Another electrical lead 100 connects the transmission line 58 to the cell housing end plate 102 of the induction cell 94. The cathode stalk 92 is supported and vacuum-sealed relative to the induction core housing end plate 104 by the cathode stalk insulator 106. Alternate designs for cathode stalk insulator 106 can be used. For example, the insulator could be placed between cathode 86 and cell housing end plate 116, thereby eliminating the need for insulator 117. The injector 40 is mounted within housing tube 108.

Electrical pulses are supplied from transmission line 58 to lead 98 at lead connection point 110 of the transmission line 58. Similarly, pulses are supplied from lead connection point 112 to lead 100. Surrounding the cathode stalk 92 and spaced a short distance therefrom is an inner tube 113. For an optimal cathode stalk 92 diameter of 0.75 centimeters, the electrical stress on the stalk 92 is approximately one hundred kilovolts per centimeter. This is considered acceptable for twenty nanosecond pulses.

The electric field required to rapidly initiate emission from a field emission cathode is approximately two hundred kilovolts per a centimeter. For a cathode-anode voltage of one hundred kilovolts, this field is achieved for a cathode-anode spacing of approximately 0.5 centimeters. For these parameters, the space-charged limited current density is three hundred and seventy amps per square centimeter. Thus, for a beam current of ten amps, the diameter of the cathode emitter 96 must be approximately 0.2 centimeters.

The electron beam injector 40 is mounted within housing 26. The housing tube 108 has fixedly mounted therein the induction cell 94. Housing end plate 104 and forward cell housing end plate 116 are also fixedly mounted to the housing tube 108. Between the end plates 116 and 102 is located an insulator 117 which is sealed to end plates 116 and 102 using 0-rings or some other means (not shown). The function of the insulator 117 is to electrically insulate the anode 90 and housing tube 108 from cell housing end plate 102.

The induction cells 78 dominate the length and weight of the linear induction accelerator. The goal in designing the cells 78 is to provide the optimum combination of high core inductance (for the duration of the applied voltage pulse) and small size so that reasonable tool length and weight can be achieved. The induction cell size 78 is chosen to provide the volt-seconds required to inductively hold off the drive voltage during the drive pulse. The material of the induction core 118 of each of the induction cells 78 is selected to minimize the variation of the saturation field strength and the magnetic permeability with temperature. It has been determined that the following materials are satisfactory: #2605CO Metglas (ferromagnetic material) manufactured by Allied Signal Corporation and Q1 (a nickel-zinc ferrite material) manufactured by National Moldits Corporation. These materials meet the requirements for a temperature range of 0° C. to 175° C. A linear induction accelerator uses a non-resonant structure (unlike radio frequency linear accelerators) and, thus, is inherently insensitive to temperature.

The accelerator drive voltage is made as large as possible to minimize the number of induction cells 78. However the drive voltage must not be large enough to risk electrical breakdown. A value of fifty kilovolts is considered to be a good compromise. The pulse length is chosen as a compromise between large values which increase the induction core dimensions, and small values which are difficult to generate using reasonable designs for the pulse generator 38. A value of approximately twenty nanoseconds appears to be a good choice for many applications.

The inner diameter of the induction cores 118 is chosen to provide for a reasonable diameter for the electron beam 82 and to allow room for beam focusing elements composed of a plurality of magnets 120. An inner diameter of induction cores 118 of approximately three centimeters is satisfactory. The outer diameter of the induction cores 118 is chosen so the cells can be contained within the tube forming housing 26. A desirable length for each induction cell 78 (in the direction of the beam 82) would be approximately thirteen centimeters. For the resultant core dimensions it is determined that the magnetization current will be approximately three hundred amps for a single cell 78. Thus for the required beam current of ten amps, the total current delivered to single cell 78 is three hundred and ten amps and the cell impedance is 50,000 volts divided by three hundred and ten amps equals approximately one hundred and sixty ohms. For a fifty kilovolt cell and a final energy of electron beam 82 of one megavolt, eighteen of the cells 78 are needed. These cells 78 and the electron beam injector 40 are electrically driven in parallel and thus the total linear induction accelerator impedance is approximately 8 ohms.

Within the linear induction accelerator each of the eighteen cells (or whatever number is used) are constructed substantially identical. The design for each cell 78 is shown specifically in FIG. 4. The induction core assembly for each cell 78 is made up of one or more Metglas cores 118 with a total length of approximately eleven centimeters. These cores 118 are annular and are constructed of fifteen micron thick Metglas material and approximately five micron thick Kapton material wound on a thin wall tube 122. The iron tube 122 is slipped over and surrounds an assembly of quadrupole lenses 124. Referring particularly to Figure 4, it can be seen that within each cell 78 the tube 122 encompasses four in number of the quadrupole lenses 124. It is considered to be within the scope of this invention that the number of these lenses 124 can be increased or decreased without departing from the scope of this invention.

The induction cores 118 of each cell 78 is mounted in a stainless steel cell housing 126 which is welded or otherwise sealed to provide a vacuum type boundary between induction cores 118 and the beam path 80. The housing tube 108 is a continuous tube with holes 130 to provide access for the electrical leads 132. Each of the cells 78 are slipped into the housing tube 108 and fixedly secured in place as with screw fasteners or spot welding where the cell housings 126 contacts the wall of the housing tube 108. Several welds or screw joints are made around the intersection of cell housing 126 and tube 108 to insure that good electrical contact is achieved. A portion of the cell housing 126 includes a smaller diameter end plate 134. In between the smaller diameter end plate 134 and the larger diameter end plate of the cell housing 126 of the next succeeding cell 78, there is located a cell insulator 136. Each cell insulator 136 is annular and contains O-ring seals (not shown) which are to be compressed during installation of each of the cells 78 within the housing tube 108. As each cell 78 is moved into place and the cell insulators 136 are compressed, then the attachment between housing tube 108 and cell housing 126 is made. The applied voltage of each cell 78 appears across the accelerating gap 138. This gap 138 should be as small as possible to achieve as short as possible total accelerator length but wide enough to avoid vacuum breakdown between the electrodes and surface breakdown across the insulator 136. For the short pulse length of interest here (approximately twenty nanoseconds) a stress of approximately one hundred kilovolts per centimeter can be sustained reliably between the electrodes for the design shown in FIG. 4. Thus the accelerating gap width for a fifty kilovolt drive voltage is 0.5 centimeters.

The insulators 136 are sealed to the cell housing 126 and to the smaller diameter end plate 134 with high temperature O-rings (not shown) made of silicon rubber or fluorocarbon material to provide good vacuum integrity at temperatures of more than 175° C. It is to be remembered that the path 80 is under a continuously applied vacuum. Loss of that vacuum is prevented between the cells 78 by means of the insulators 136 and their seals. Therefore, it is exceedingly important to tightly seal the insulators 136 relative to the cell housing against plates 126 and 134 and this is accomplished by the aforementioned seals. Alternatively, the insulators can be sealed using brazing and welding techniques.

Exteriorly of the insulators 136 and exteriorly of the induction cores 118 of the cells 78 there is located an annular gap area 140. This gap area 140 of cells 78 is filled with a fluid which can be either a liquid or gas having a high resistance to electrical breakdown over a temperature range of approximately 0° C. to 175° C. Good choices for this fluid are silicon oil, Fluorinert dielectric fluid and sulphur hexafluoride ($SF_6$) gas at a pressure of approximately fifty pounds per square inch.

Referring previously to the injector shown in FIG. 6, surrounding the induction core 94 and the insulator 117 is a gap area 142. This gap area 142 is to also be immersed in the fluid previously mentioned. The applied vacuum is to be subjected to the gap area 144 surrounding the cathode stalk 92 and the stainless steel cathode 86. The stalk insulator 106 is tightly sealed by an O-ring 146 or other means to insure that the vacuum located within gap 144 is maintained. End plate 116 is tightly welded to the wall of housing tube 108.

It is desirable to minimize the electrical capacitance of each of the cells 78 in order to minimize the rise time of applied voltage pulses. This is accomplished by reducing the diameter of the cell housing end plates 134 and by providing sufficient annular gap area 140 with a design indicated in FIG. 4. The cell capacitance is approximately 20 picofarads and the electrical stored energy at fifty kilovolts is less than 0.1 joules. Because this is substantially less than the energy expanded to magnetize the induction cores 118, the electrical capacitance will cause the rise time of the applied voltage pulse to be substantially less than the pulse length.

The transmission line 58 is depicted generally within FIGS. 9 and 10 of the drawings. The transmission line 58 consists of a thin (about one millimeter thick) copper strip which is tapered in width along its length from large end 147 to small end 148. End 147 will be approximately five centimeters in width and end 148 will be approximately one millimeter in width. The thickness of the transmission line 58 of about one millimeter is shown in FIG. 10. The depicted overall length of the transmission line 58 will be about two hundred and fifty centimeters. The ground return for transmission line 58 is provided by the outer wall of housing tube 108 and the inner wall of housing 26.

The upper surface of the transmission line 58 includes a plurality of points of connection which are represented generally by screw fasteners 110 and 112 as well as other fasteners 114. It is to be noted that there is to be a separate fastener for each point of connection. In relation to each cell 78, each electrical lead 132 will connect with a fastener 114. Therefore, there will be eighteen in number of the fasteners 114. However for illustrative purposes only in conjunction with the drawings, there is shown only six in number of the fasteners 114. Each of the leads 132 is to be physically tightly secured by fasteners 114 binding such against the body of the transmission line 58 so as to ensure good electrical contact.

It is to be noted that the transmission line 58 is tapered in width for the purpose of maintaining a matched electrical impedance as current is tapped off by the leads 132. It is important that the electrical impedance to each cell 78 be substantially constant. When current is tapped off for the first cell 78 in this series of cells, less current will be required to drive the remaining cells and, thus, the impedance of transmission line 58 must change. This change in the impedance for each succeeding cell 78 is compensated for by the physical narrowing of the transmission line 58. This same is true for the entire series of the cells 78. It is to be noted that the strip 58 is to be insulated from tubes 108 and 26 using single or multiple layers of a dielectic material (not shown) such as Kapton or other insulating material. Kapton is selected because of its excellent electrical insulative properties at or above 175° C.

Instead of the tapered transmission lines 58, there may be utilized individual conductors to each electrical connection or group of connections 132. It is also considered within the scope of this invention that any means could be utilized to connect to the connectors 132 as long as essentially identical electrical impedance is supplied to each cell 78. This includes the use of more than one connector 132 per cell 78 and the connection of leads 132 at different points on the diameter of the smaller diameter end plate 134.

The permanent magnet quadrupole lens assembly 124 is shown in FIG. 5. This lens assembly 124 incorporates a number of permanent magnets 120 located in a specific north/south sequence as shown in FIG. 5. This sequence produces magnetic flux lines 150. These flux lines 150 apply forces to the electrons in beam 82 thereby keeping beam 82 confined near to the center of the path 80. Alternatively, one can use permanent magnet solenoid lenses or electromagnetic solenoid lenses as opposed to the use of the permanent magnet type of quadrupole lens shown in FIG. 5.

The permanent magnet lens shown in FIG. 5 of the size and strength required for the subject invention for a linear induction accelerator used in logging applications are fabricated using magnets 120 with a high Curie temperature such as ferrite or sumarium-cobalt. The cross-sectional dimensions of the magnets 120 for use in conjunction with the logging tool 24 of the present invention would have square sides of approximately four millimeters each for ferrite magnets. These magnets will produce a field of approximately one thousand gauss at the face of the magnet at room temperature for a diameter of tube 122 of approximately two centimeters. The magnetic field at the face of each of the magnets is reduced to approximately six hundred gauss at a temperature of 175° C. The magnets 120 are held in an aluminum holder 154 which has an outer diameter 156 of approximately three centimeters and an inner diameter 158 of approximately one centimeter. Each lens 124 is approximately one centimeter long. The number of lenses per cell 78 is shown to be four in number. However, the number of lenses can vary along the length of the accelerator.

It is generally necessary to have the longitudinal center axis 152 of the beam 82 to be located parallel to the longitudinal center axis of the apparatus 24 as well as the longitudinal center axis of the borehole 20. However, it is necessary to have the x-rays produced by the beam 82 to be projected into the media 22, transverse to the axis 152. In order to achieve this, there is utilized the bending magnet 44. This magnet 44 is an approximately three centimeter diameter dipole magnet, or portion of a three centimeter diameter dipole magnet, located just downstream of the output of the accelerator cell assembly 42. The magnet 44 has a high Curie temperature and a low temperature coefficient. Good choices include Alnico and sumarium-cobalt materials. The field strength of the magnet is approximately 1.5 kilogauss. The bending magnet 44 is to deflect the beam 82 approximately sixty degrees onto the x-ray target 46.

The x-ray target 46 consists of a sheet of tantulum or other material with a high atomic number. In the case of tantulum, the sheet thickness is approximately 0.013 cm which maximizes the intensity of the x-ray emission. Heat deposited in the target 46 by the electron beam 82 is dissipated by conduction and radiation to the surrounding structure. The target 46 converts the electron beam energy to x-rays and directs them through a collimator 160 into the media 22. The collimator 160, which is formed in x-ray shield 53, defines the angle subtended by the beam of x-rays from the target 46. The center line of the beam from the target 46 is depicted as 162. Shield 53 is formed of lead or other material which does not readily transmit x-rays.

The detector assembly of the subject invention consists of four in number of x-ray detectors which have been previously defined as detector 48, detectors 50 and detector 52. The detector assembly included within the logging tool 24 of the present invention also includes detector power supplies and signal amplifiers. The outputs from the amplifiers are digitized, processed, multiplexed and transmitted to the surface by the data processing and transmission unit 54. Collimators are provided for each of the detectors in the form of holes of prescribed geometry, bored into the lead radiation shield 53. Also encompassed within this invention are detector arrangements consisting of a larger or smaller number of detectors.

Detector 48 is shielded from the media 22 by the lead radiation shield 53 and views only the x-ray target 46 through collimator 166. Detector 48 is used to monitor the x-ray source intensity. The peak amplitude of the signals from detectors 50 and 52 are scaled by the peak amplitude from detector 48 in order to correct for any variations in source intensity.

Detector 52 which is located furthest (approximately 30 centimeters) from the output end of collimator 160 is the primary sensor of formation density within the media 22. Its location is determined by the requirement that a sufficient number of x-rays must be received to provide a statistically accurate signal for the highest anticipated formation densities. The collimator 164 for this detector defines a collecting area of approximately ten square centimeters. A graded filter (not shown) is located in front of the detector 52 which passes only photons with energies greater than 300 keV so that only Compton scattering processes are observed. Detector 52 is shielded in all other directions by radiation shield 53 in order to prevent detection of photons which are not scattered from the formation.

Detectors 50 are placed close to and at the same distance from the source (output of collimator 160) as shown in FIG. 2. The arrangement of the detectors 50 is clearly shown in FIG. 8. Detectors 50 comprise two in number of detectors, detector 172 and detector 174. It is the function of detectors 172 and 174 to enable the measurement of low energy x-rays scattered from the media 22. Detectors 172 and 174 are used to obtain information on photoelectric absorption which is used to help determine the composition of the media 22. Detector 172 is connected to collimator 168 and detector 174 is connected to collimator 170. Associated with collimator 168 is a graded filter 176 and associated with collimator 170 is graded filter 178. Because of the proximity of detectors 172 and 174 to the source defined by the output of collimator 160, the collimators 168 and 170 are designed to have the relatively small x-ray collection area (approximately one square centimeter) and to eliminate x-rays which do not pass through the media 22. Graded filter 176 is designed to permit x-rays with energies of 50 keV or greater to be conducted into collimator 168. Graded filter 178 permits x-rays with energies of one hundred keV or greater energy to be conducted into collimator 170. The difference in the signals from the detectors 172 and 174 provides information on the low energy portion of the x-ray spectrum (from approximately 50–100 keV) which is dominated by photoelectric effects which, in turn, depends primarily on the atomic numbers of the formation constituents within the media 22. Radiation shielding 53 is to be placed around the detectors 172 and 174 in order to minimize the interception of x-rays which pass directly through the logging tool 24 of this invention, or which are scattered by logging tool 24 or which could enter the logging tool 24 from the opposite side.

A variety of detector arrangements may be utilized in accordance with the present invention, one suitable selection being the scintillation-type of radiation detector. Each detector 48, 172, 174 and 52 is to consist of a scintillator crystal (sensitive to x-rays) combined with a photomultiplier tube assembly or any alternative which provides adequate sensitivity to x-rays over the required temperature range. In the case of detectors formed by combining a scintillator crystal with a photomultiplier tube, it may be necessary to locate a neutral density filter between the crystal and the tube in order to limit the peak intensity of the light emission from the crystal while preserving the statistical accuracy of the measurement of x-ray intensity.

The pulses from the detectors are amplified in preamps which are included as part of the detectors (48, 172, 174 and 52) or within the data processing and transmission unit 54. Also included within the unit 54 are data processing and transmission components (not shown) by which the pulses are to be transmitted to the surface 30 according to presently known techniques.

The output of the detectors 48, 172, 174 and 52 are transmitted electrically to a data processing and transmission unit 54. Within unit 54, the output from the detectors 48, 172, 174 and 52 are processed and then transmitted to the surface of the earth by means of output cable 180 which forms part of the cable arrangement 28. Cable arrangement 28 also includes an input power cable 182 which supplies input power to the power distribution unit 34.

In the production of materials such as oil and gas, certain properties of a subterranean reservoir must be determined. Two of the most important of these properties are the bulk density and the lithology of the reservoir media. The bulk density of the media is the ratio of its aggregate mass divided by aggregate volume. The lithology of the media refers to its composition. Other media properties such porosity can be determined once the bulk density and lithology are known.

The discovering of these properties can be accomplished by taking core samples and carrying out well defined measurement techniques with the samples. The taking of core samples is very time consuming as well as expensive. In recent years the utilization of a borehole tool which can make readings to determine these properties has been known. These borehole tools can make accurate measurements even while the tool is being raised at a rather rapid rate within the borehole.

The pulses from the detectors are amplified in preamps which are included as part of the detectors (48, 172, 174 and 52) or within the data processing and transmission unit 54. Also included within the unit 54 are data processing and transmission components (not shown) by which the pulses are to be transmitted to the surface 30 according to presently known techniques.

What is claimed is:

1. An apparatus for logging media comprising:
   first means for producing a series of repetitive electrical pulses;
   an electron beam injector receiving said electrical pulses and producing an electron beam;
   a plurality of induction-type acceleration cells of a linear induction accelerator, said cells containing magnetic induction cores, said cells receiving said electron beam and confining and focusing and directing said electron beam along a path, said cells receiving said pulses which drive said cells, each cell of said cells containing a plurality of permanent magnets encompassing said path, said magnets producing a substantially constant magnetic field over the operating temperature range of $-10°$ C. to $200°$ C., said induction cores to provide a high inductance for said electrical pulses and said magnets to focus and guide said electron beam, said cells substantially raising the energy level of said electron beam;
   second means for producing x-rays, said second means to receive said electron beam and responsively create a stream of x-rays, said stream of x-rays to be emitted exteriorly of said apparatus and penetrate said media; and
   detector means located to receive scattered said x-rays from said media, whereby comparing of the energy and amount of said x-rays received by said detector means to the amount of x-rays emitted exteriorly of said apparatus results in a determination as to the properties of density and composition of said media.

2. The apparatus as defined in claim 1 wherein:
   vacuum means are included within said apparatus, said vacuum means to draw a vacuum within said path.

3. The apparatus as defined in claim 1 wherein:
   said acceleration cells being spaced apart and located in an in-line arrangement, each said cell to be driven by a said electrical pulse, each said cell to receive substantially the same voltage and current.

4. The apparatus as defined in claim 3 wherein:
   said cells being evenly spaced apart.

5. The apparatus as defined in claim 1 wherein:
   said apparatus being confined within a housing, said housing being cylindrical, the diameter of said cylindrical housing being constant and no greater than twenty centimeters.

6. The apparatus as defined in claim 1 wherein:
   said acceleration cells with the exception of said path being immersed within a fluid having a high electrical breakdown strength.

7. The apparatus as defined in claim 1 wherein:
   direction-altering means mounted within said apparatus, said direction-altering means for redirecting said electron beam to a direction substantially transverse to the direction of said path.

8. The method of logging the media surrounding a borehole that transverses an earth formation comprising the steps of:
   repetitively producing electrical pulses;
   conducting of said pulses into a transmission line which connects to an in-line series of induction-type acceleration cells containing induction cores;
   producing electron beam pulses and supplying said electron beam pulses to said acceleration cells with said electron beam pulses being accelerated to a high energy level;
   bombarding a target with said electron beam pulses that are now accelerated to said high energy level causing production of x-ray pulses;
   directing said x-ray pulses into said media obtaining a scattered burst of x-rays with each x-ray pulse of said x-ray pulses;
   detecting x-rays in specified energy ranges for each said scattered burst so that the properties of said media can be determined from a single said scattered burst; and
   providing a transmission line assembly, which is impedance matched along its longitudinal length, to said series of induction-type acceleration cells so that each pulse that is transmitted to each said acceleration cell is essentially identical in voltage, current and duration.

9. The method of logging the media surrounding a borehole that transverses an earth formation comprising the steps repetitively producing electrical pulses;

conducting of said electrical pulses into a transmission line which connects to a series of induction-type acceleration cells containing induction cores with said transmission line being constructed to supply essentially the same voltage, current and pulse length to each cell of said acceleration cells;

producing electron beam pulses and supplying said electron beam pulses to said acceleration cells with said electron beam pulses being accelerated to a high energy level;

bombarding a target with said electron beam pulses that are now accelerated to said high energy level causing production of x-ray pulses;

directing of said x-ray pulses into said media obtaining a scattered burst of x-rays with each x-ray pulse of said x-ray pulses; and detecting x-rays in specified energy ranges for each said burst so that the properties of said media can be determined from a single said burst.

10. An apparatus for logging the media surrounding a borehole that traverses an earth formation, said borehole having a longitudinal center axis, said apparatus comprising:

means for producing a repetitive series of electrical pulses, said means including a strip transmission line which has a plurality of separate points of connection along its longitudinal length;

means for producing an electron beam;

a linear induction accelerator means for receiving said electrical pulses and said electron beam, said electrical pulses causing acceleration of said electron beam to high energy levels along a path generally parallel to said longitudinal center axis of the borehole, said linear induction accelerator means being constructed of a plurality of separate induction cells, each said cell having a center opening with said center openings of said cells combining to form said path, each said induction cell being electrically connected to said transmission line by means of a said point of connections, said transmission line being constructed so the electrical impedance is substantially equal for each said induction cell;

direction altering means for redirecting said electron beam from said path to a direction substantially transverse to said longitudinal center axis;

means responsive to bombardment by said electron beam for repetitively emitting bursts of x-rays that penetrate said media; and means for detecting scattered x-rays, whereby based on the quantity and type of x-rays that are scattered a determination is made as to the properties of density and composition of said media.

11. The apparatus as defined in claim 10 wherein:
said electrical pulses each being of substantially the same length and being between one and fifty nanoseconds in length.

12. The apparatus as defined in claim 11 wherein:
said electrical pulses being substantially twenty nanoseconds in length.

13. The apparatus as defined in claim 10 wherein:
said transmission line being tapered along its length which causes said electrical impedance to be substantially equal, at each said induction cell.

14. The apparatus as defined in claim 10 wherein:
a housing tube including within said linear induction accelerator means, said induction cells being fixedly mounted within said housing tube in an in-line arrangement.

15. The apparatus for logging the media surrounding a borehole that traverses in earth formation, said borehole having a longitudinal center axis, said apparatus comprising:

means for producing a repetitive series of electrical pulses, said means includes a pulse-forming line formed of alternating strips of electrically conductive plates and electrically insulating sheets;

means for producing an electron beam;

a linear induction accelerator means for receiving said electrical pulses and said electron beam, said electrical pulses causing acceleration of said electron beam to high energy levels along a path generally parallel to said longitudinal center axis of the borehole;

direction altering means for redirecting said electron beam from path to a direction substantially transverse to said longitudinal center axis;

means responsive to bombardment by said electron beam for repetitively emitting bursts of x-rays that penetrate said media; and means for detecting scattered x-rays, whereby based on the quantity and type of x-rays that are scattered, a determination is made as to the properties of density and composition of said media.

16. The apparatus as defined in claim 15 wherein:
said electrical pulses each being of substantially the same length and being between one and fifty nanoseconds in length.

17. The apparatus as defined in claim 16 wherein:
said electrical pulses being substantially twenty nanoseconds in length.

18. The apparatus as defined in claim 15 wherein:
said linear induction accelerator means includes a plurality of electromagnetic lenses, said lenses functioning to focus and confine said electron beam.

19. The apparatus as defined in claim 13 wherein:
said linear induction accelerator means includes a plurality of quadrupole magnetic lenses each constructed of a plurality of permanent magnets encompassing said path, said permanent magnets functioning to focus and confine said electron beam, each quadrupole magnetic lens of said plurality of quadrupole magnetic lenses producing a substantially constant magnetic field over the operating temperature range of $-10°$ C. to $200°$ C.

20. The apparatus as defined in claim 15 wherein:
said direction-altering means comprises a bending magnet.

21. The apparatus as defined in claim 15 wherein:
said pulse forming line being electrically connected with a gas filled, spark gap switch which, when triggered, discharges a pulse into said linear induction accelerator means.

22. The apparatus as defined in claim 15 wherein:
said apparatus being mounted within a cylindrical housing, said cylindrical housing having a diameter no greater than twenty centimeters.

23. An apparatus for logging media comprising:
first means for producing a series of repetitive electrical pulses;

an electron beam injector receiving said electrical pulses and producing an electron beam;

a plurality of induction-type acceleration cells of a linear induction accelerator, said cells containing magnetic induction cores, said cells receiving said electron beam along a path, said cells receiving said pulses which drive said cells, each cell of said cells containing a plurality of permanent magnets encompassing said path, said magnets producing a substantially constant magnetic field over the operating temperature range of $-10°$ C. to $200°$ C., said induction core is to provide a high inductance for said electrical pulses and said magnets to focus and guide said electron beam, said cells substantially raising the energy level of said electron beam;

second means for producing x-rays, said second means to receive said electron beam and responsively create a stream of x-rays, said stream of x-rays to be emitted exteriorly of said apparatus and penetrate said media; and detector means located to receive scattered said x-rays from said media, said detector means comprises a plurality of separate detectors, at least two said detectors to detect low energy x-rays and at least one other said detector to detect high energy x-rays, said detectors that detect low energy x-rays being located in between said detector that detects high energy x-rays and the point of emission of said x-rays into the media, whereby comparing of the amount of said x-rays received by said detector means to the amount of x-rays emitted exteriorly of said apparatus results in a determination as to the properties of density and composition of said media.

24. The apparatus as defined in claim 23 wherein:

said detectors to detect the low energy x-rays being placed at the same distance from the point of emission of said x-rays that penetrates said media, each said detector of the low energy x-rays including means for detecting x-rays in a different energy range.

* * * * *